United States Patent
Moffitt et al.

(10) Patent No.: US 7,158,132 B1
(45) Date of Patent: Jan. 2, 2007

(54) METHOD AND APPARATUS FOR PROCESSING PRIMITIVE DATA FOR POTENTIAL DISPLAY ON A DISPLAY DEVICE

(75) Inventors: Stephen Moffitt, Menlo Park, CA (US); Eng Lim Goh, Singapore (SG)

(73) Assignee: Silicon Graphics, Inc., Mountain View, CA (US)

( * ) Notice: Subject to any disclaimer, the term of this patent is extended or adjusted under 35 U.S.C. 154(b) by 238 days.

(21) Appl. No.: 10/715,882

(22) Filed: Nov. 18, 2003

(51) Int. Cl.
    *G06T 15/40* (2006.01)
(52) U.S. Cl. ............... 345/421; 345/419; 345/620; 345/622; 345/624
(58) Field of Classification Search ............ 345/421, 345/620, 623, 419, 582, 622, 624
    See application file for complete search history.

(56) References Cited

U.S. PATENT DOCUMENTS

| | | | |
|---|---|---|---|
| 5,986,669 A | 11/1999 | Kirkland | 345/434 |
| 6,636,215 B1 | 10/2003 | Greene | 345/422 |
| 6,664,959 B1 * | 12/2003 | Duluk et al. | 345/422 |
| 6,967,664 B1 * | 11/2005 | Taylor et al. | 345/620 |
| 2002/0196251 A1 | 12/2002 | Duluk et al. | 345/420 |
| 2004/0196281 A1 | 10/2004 | Huang | 345/419 |

OTHER PUBLICATIONS

T. Chiueh et al., "Characterization of Static 3 D Graphics Workloads," Proceedings of the Siggraph/Eurographics Workshop on Graphics Hardware, pp. 17-24, 1997.

P. Ebbesmeyer, "Textured Virtual Walls-Achieving Interactive Frame Rates During Walkthroughs of Complex Indoor Environments," IEEE 1998 Virtual Reality Annual International Symposium, pp. 220-227, 1998.

* cited by examiner

Primary Examiner—Kimbinh T. Nguyen
(74) Attorney, Agent, or Firm—Bromberg & Sunstein LLP

(57) ABSTRACT

A method and apparatus for processing a primitive (for potential display as a part of a graphical image on a display device) cause attribute data to be received by a graphics processor as a function of whether the primitive is capable of being viewable in the graphical image on the display device. Before taking that action, however, the method and apparatus assemble the primitive as a function of its positional data, and then determine if the primitive is capable of being viewable in the graphical image on the display device.

20 Claims, 4 Drawing Sheets

METHOD AND APPARATUS FOR PROCESSING PRIMITIVE DATA FOR POTENTIAL DISPLAY ON A DISPLAY DEVICE

RELATED APPLICATIONS

This patent application is related to U.S. patent application Ser. No. 10/716,186, now U.S. Pat. No. 6,900,818, filed on even date, entitled, "PRIVTIVE CULLING APPARATUS AND METHOD," and naming Stephen Moffitt and Eng Lim Goh as inventors, the disclosure of which is incorporated herein, in its entirety by reference.

FIELD OF THE INVENTION

The invention generally relates to graphics processing and, more particularly, the invention relates to processing graphics primitives for potential display on a display device.

BACKGROUND OF THE INVENTION

Many computer systems have a specialized graphics subsystem for producing vivid graphical images. At the core of these subsystems typically is a graphics processor that processes graphical data in a highly streamlined manner. In simplified terms, the graphics processor converts substantially unprocessed graphical data into a format that can be displayed on a conventional display device (e.g., a cathode ray tube display or a liquid crystal display).

As part of the image display process, applications executing on the host processor typically produce basic graphical data for processing by the graphics processor. Those applications may use standard function calls (e.g., as used in standardized graphics routing libraries, such as OPENGL or DIRECT3D) to forward such graphical data to the graphics processor via a high-speed bus (i.e., the "interface bus"). When using the noted function libraries, the data generally is in the form of graphics primitives, such as triangles, lines, or points and thus, includes vertex coordinates and vertex attributes, such as normal vectors, texture coordinates, and colors.

As graphics processing power has dramatically increased, the amount of data being visualized has correspondingly increased. Consequently, the load on the interface bus also has significantly increased. In many instances, however, graphics processors are capable of processing data faster than the data can be forwarded across the interface bus. Accordingly, in those situations, the speed of the interface bus limits host application performance.

Moreover, some data forwarded across the interface bus is not even necessary for producing the graphical image to be displayed. Specifically, graphics subsystems often receive large amounts of primitive attribute data that will not to be visible when ultimately displayed. For example, some primitives may be outside of the viewing area on the display device. Although such primitives should be rejected during geometry processing, the graphics processor still receives their attribute data. Accordingly, the graphics processor still incurs the full bandwidth cost of receiving the data across the interface bus.

U.S. Pat. No. 5,986,669 ("Kirkland") shows an exemplary system having these inefficiencies. Specifically, Kirkland shows a graphics processor (referred to as a "rendering engine") that first receives vertex attribute data relating to an image, and then determines if such data should be further processed. In other words, the graphics processor receives vertex attribute data even if it ultimately does not process that data. Accordingly, although it appears to save geometry processing by not processing all the attribute data, Kirkland does not reduce the load on the interface bus or at the graphics processor input.

SUMMARY OF THE INVENTION

In accordance with one aspect of the invention, a method and apparatus for processing a primitive (for potential display as a part of a graphical image on a display device) cause attribute data to be received by a graphics processor as a function of whether the primitive is incapable of being viewable in the graphical image on the display device. Before receiving the attribute data, however, the method and apparatus assemble the primitive as a function of its positional data, and then determine if the primitive is incapable of being viewable in the graphical image on the display device.

In some embodiments, the graphics processor receives at least a portion of the attribute data if the primitive is not determined to be incapable of being viewable in the graphical image on the display device. The graphics processor does not receive the attribute data if the primitive is determined to be incapable of being viewable in the graphical image when displayed on the display device. Among other ways, the method and apparatus may determine if the primitive is capable of being viewable in the graphical image by performing culling operations to the assembled primitive.

The attribute data may be stored in memory that is external to the graphics processor. In such case, the attribute data may be forwarded from the memory to the graphics processor in the predefined manner. Moreover, the primitive may be assembled by forwarding a pointer to the graphics processor. The pointer may point to memory capable of storing the positional data. In some embodiments, the graphics processor rasterizes the assembled primitive if it receives the attribute data.

In accordance with another aspect of the invention, an apparatus (which cooperates with a graphics processor input) for processing a primitive (for potential display as a part of a graphical image on a display device) has an assembler capable of assembling the primitive as a function of the positional data, and a primitive pre-processor operatively coupled with the assembler. The primitive pre-processor is capable of determining if the primitive is incapable of being viewable in the graphical image on the display device. The apparatus also has a receiving module operatively coupled with the primitive pre-processor. The receiving module is capable of causing the attribute data to be received by the graphics processor input as a function of whether the primitive is incapable of being viewable in the graphical image on the display device.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

In illustrative embodiments of the invention, a graphics processor does not receive attribute data for a primitive when it determines that the primitive ultimately will not be viewable in a displayed graphical image. For example, in various embodiments, the graphics processor will not receive attribute data for a given primitive that ultimately will be culled. In that case, the graphics processor may simply stop processing that primitive. Accordingly, instead of processing the given primitive, the graphics processor simply begins processing the next primitive. Again, if the next primitive is to be culled, the graphics processor begins processing yet another primitive. This process continues for each primitive in the image.

By controlling data flow in this selective manner, less unnecessary primitive data (i.e., attribute data for primitives that will not be visible) should be forwarded through the graphics processor input. Consequently, the full bandwidth of the graphics processor input can be used for receiving relevant primitive data, thus improving overall system performance. Details of various embodiments are discussed below.

Figure 1:
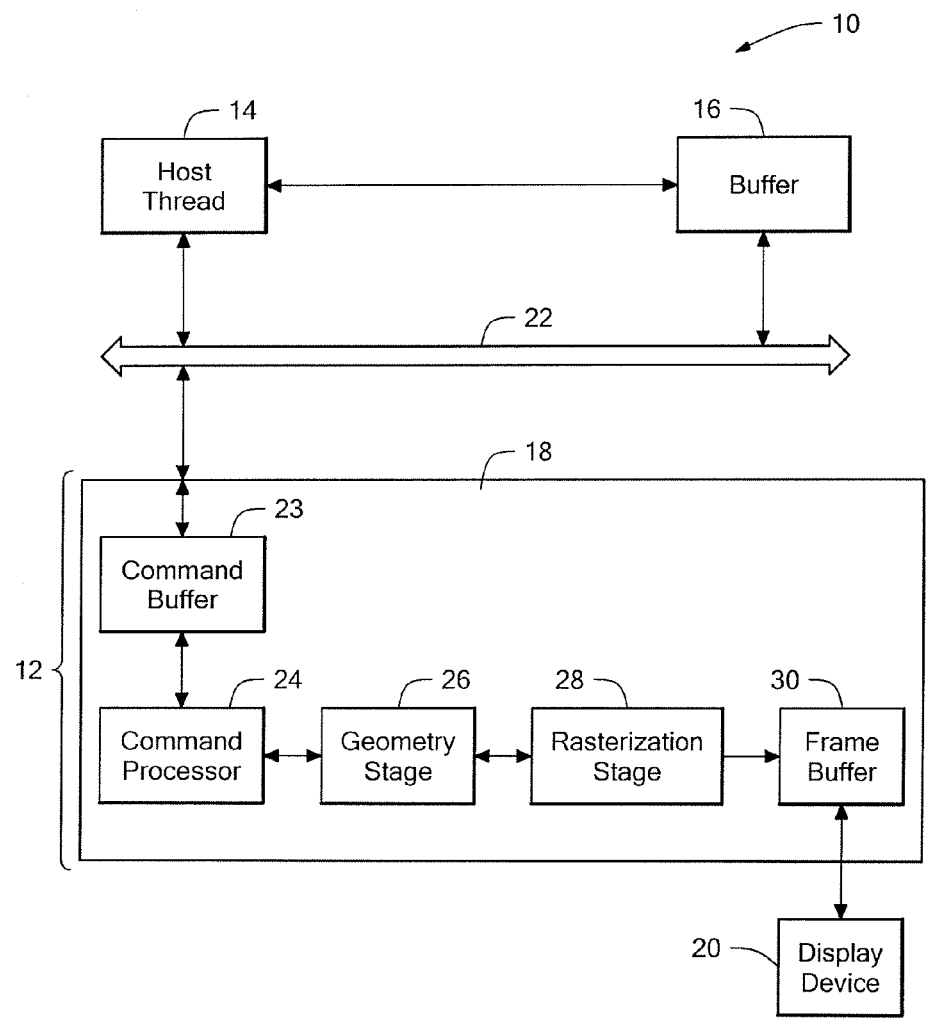
FIG. 1 schematically shows a portion of a computer system that may implement illustrative embodiments of the invention.

FIG. 1 schematically shows portions of a computer system 10 on which various embodiments of the invention may be implemented. In particular, the computer system 10 has a host thread 14 for generating vertex primitive data (e.g., attribute and positional data for any conventional graphics primitive type known in the art, such as triangles, lines, and points) for images to be displayed, and a buffer 16 for storing the primitive data generated by the host thread 14. In illustrative embodiments, the buffer 16 is formed in system memory within the general computer system 10. An interconnect apparatus, such as a PCI bus 22, provides a communication link between the various computer system components.

The computer system 10 also has 3D graphics subsystem 12 implementing the OPENGL standard, which was initially developed by Silicon Graphics, Inc. of Mountain View, Calif. It should be noted that discussion of such a computer system 10 and graphics subsystem 12 is exemplary and thus, is not intended to limit all embodiments of the invention. Accordingly, various embodiments of the invention can be applied to other graphics processing types and standards (e.g., DIRECT3D and 2D graphics subsystems).

As shown in FIG. 1, the graphics subsystem 12 has a number of components for producing and displaying 3D graphical images. Specifically, the graphics subsystem 12 may include a graphics processor 18 for transforming and rasterizing primitive data generated by the host thread 14 into a format that can be displayed on a display device 20. In simplified terms, the graphics processor 18, which may be implemented in either hardware or software, includes a series of stages for converting a mathematical representation of a 3D image into a corresponding 2D image that can be rendered on the display device 20. To those ends, the graphics processor 18 includes the following components:

1) a command buffer 23 (e.g., memory configured in a first-in, first-out manner) that buffers input commands from the host thread 12 (effectively acting as an input to the graphics processor 18) for load balancing purposes, 2) a command processor 24 acting as the graphics processor input for receiving and pre-processing graphics commands from other system components, 3) a geometry stage 26 for performing geometry operations (e.g., lighting and transformation processes) on primitive data produced by the host thread 14, 4) a rasterization stage 28 for rasterizing primitives transformed by the geometry stage 26, and 5) a frame buffer 30 for storing processed graphical images in screen space for display on the display device 20.

Those skilled in the art should understand that the descriptions following the noted components are generalizations of their function. Accordingly, in addition to the process discussed below with regard to FIG. 3, each of the noted graphics processor stages may perform other functions known in the art.

As noted above, the graphics processor 18 may be implemented in either hardware, software, or a combination of hardware and software. When implemented as software, each stage preferably is made up of a series of computer instructions that executes across one or more high speed parallel processors. When implemented as hardware, however, each stage illustratively may be a specially designed application specific integrated circuit that performs the required functions.

Figure 2:
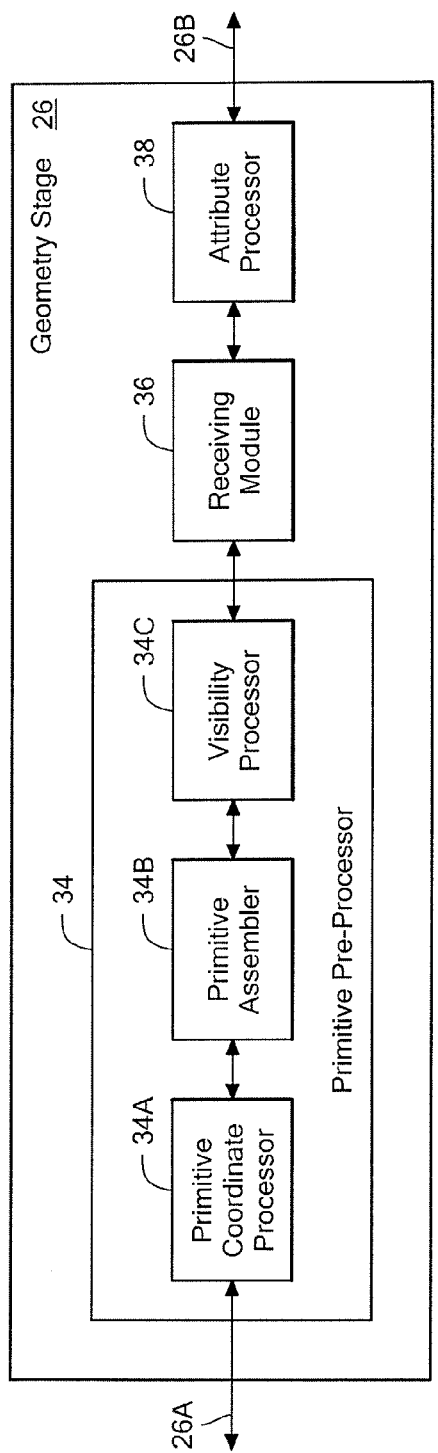
FIG. 2 schematically shows a geometry stage that may be configured to implement illustrative embodiments of the invention.

FIG. 2 schematically shows more details of the geometry stage 26 shown in FIG. 1. Among other things, the geometry stage 26 has a primitive pre-processor 34 for determining if a vertex will not be visible in an image to be displayed on the display device 20, and a receiving module 36 for selectively causing primitive attribute data to be forwarded to/received by the graphics processor input. The geometry stage 26 also has an attribute processor 38 that performs general geometry stage processes (e.g., transformation and lighting processes). A command interface 26A enables the geometry stage 26 to communicate with the command processor 24, while a raster interface 26B enables the geometry stage 26 to communicate with the rasterization stage 28.

FIG. 2 also shows more details of the primitive pre-processor 34. In particular, the primitive pre-processor 34 has a primitive coordinate processor 34A that transforms object data into screen space, a primitive assembler 34B for assembling primitives from their positional vertex data, and a visibility processor 34C for determining if assembled primitives will be visible in an image to be rendered.

Figure 3:
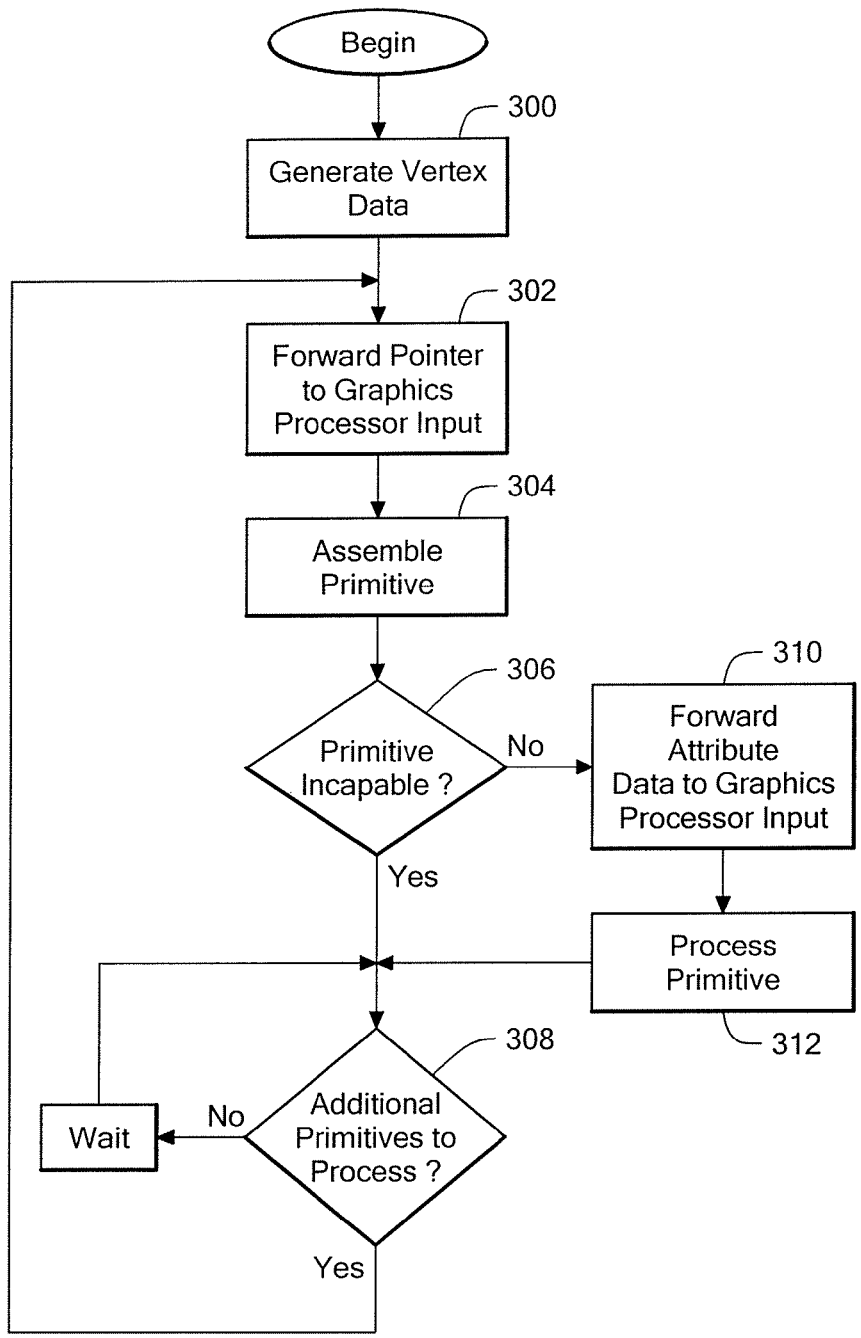
FIG. 3 shows a process of processing primitive data in accordance with illustrative embodiments of the invention.
Figure 4:
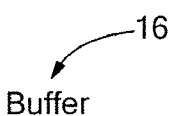
FIG. 4 schematically shows a buffer shown in FIG. 1.

FIG. 3 shows a process used by the system of FIG. 1 for reducing the amount of unnecessary primitive data received by the graphics processor input. The process begins at step 300, in which the host thread 14 generates primitive vertex data for a plurality of primitives that may be a part of a graphical image to be displayed on the display device 20. That data includes vertex attribute data (normal and texture data) and vertex positional data (coordinate data), which then is stored in the buffer 16. As an example, FIG. 4 schematically shows the buffer 16 with attribute and positional data for N vertices.

In illustrative embodiments, the vertex data are grouped in sets that each are identified by a unique tag. For example, attribute and positional data for each set of 100 vertices may be assigned successively numbered tags. After processing all vertices in a given set (see steps 306–312, discussed below), the geometry stage 26 forwards an overwrite message to the host thread 14 indicating that such data locations (in the buffer 16) may be overwritten. Accordingly, after it receives the overwrite message, the host thread 14 may store new vertex data at those address locations.

The process then continues to step 302, in which the host thread 14 generates and forwards vertex data to the graphics processor input. In illustrative embodiments, vertex data can be forwarded either explicitly or by pointer. When forwarding the vertex data explicitly, only the positional data is explicitly forwarded at this point in the process. The attribute data may be referenced by pointer.

When forwarding the vertex data by pointer, the host thread 14 may forward one pointer for both positional and attribute data. In that case, each pointer points to the buffer address location(s) having values (e.g., floating point values) representing attribute and positional data for a single vertex. In other embodiments, the host thread 14 produces two separate pointers; a positional pointer for the positional data and an attribute pointer for the attribute data. In such other embodiments, step 302 still may forward both pointers.

After receipt of one or more pointers representing a vertex, the graphics processor 18 forwards a request to retrieve the positional data from the buffer address location specified by the pointers. Note that at this point in the process, the graphics processor 18 does not request vertex attribute data for the primitive.

The process thus continues to step 304, in which the assembler 34B uses the received primitive vertex information to assemble the primitive. Specifically, using the X, Y, and Z coordinate data, the assembler 34B logically forms the vertices of the primitive as it would be formed in the display device 20. Of course, because it merely is logically assembled, the primitive is not rasterized or rendered at this point. Assembly of the primitive at this point in the process, however, permits the visibility processor 34C to determine if the primitive ultimately will be visible on the display device 20 (as discussed below). If the primitive is not culled or otherwise rejected, assembly facilitates further processing of the primitive by another stage of the graphics processor 18.

After the primitive is assembled, it is determined at step 306 if the primitive is incapable of being visible on the display device 20 when the image is rendered. To that end, the visibility processor 34C (of the primitive pre-processor 34) performs a number of culling and dipping operations on the primitive. For example, the visibility processor 34C may frustum cull, back-face cull, or occlusion cull in accordance with conventional processes. The visibility processor 34C also may cull in accordance with the process disclosed in the above noted incorporated, co-pending U.S. patent application having the same inventive entity.

The attribute data then is received by the graphics processor input (e.g., the command buffer 23) as a function of whether the primitive is incapable of being viewable on the display device 20 when rendered. More specifically, the result of the decision at step 306 determines if the attribute data will be forwarded to and received by the input of the graphics processor 18.

Accordingly, if the primitive pre-processor 34 determines (at step 306) that the primitive will not be visible on the display device 20 when the image is rendered, then it effectively discards the primitive. For example, the primitive pre-processor 34 may affirmatively discard the vertex attribute data by forwarding a message to the host thread 14 indicating that the attribute data for that primitive is not needed.

In illustrative embodiments, however, the primitive pre-processor 34 effectively discards the vertex attribute data simply by enabling the graphics processor 18 to begin processing the next primitive. To that end, when the primitive is determined not to be visible, the process continues to step 308, in which it is determined if the image still has primitives remaining to be processed. If no primitives are immediately available, the pre-processor 34 waits for other primitives. If primitives remain, however, then the process loops back to begin processing the next primitive in the image.

Conversely, if at step 306 the primitive is not determined to be incapable of being visable (i.e., it is not discarded as noted above), then the process continues to step 310, in which the primitive preprocessor 34 parses address information from the pointer identifying the buffer location of the attribute information. Next, using the address information, the primitive preprocessor 34 forwards an attribute request message to the host thread 14 requesting at least a portion of the attribute data for the vertices that make up the primitive. In illustrative embodiments, all attribute data for the primitive vertices is forwarded to the graphics processor input. Alternatively, instead of requesting the data, the graphics processor 18 directly retrieves the attribute data.

After it receives the data, the geometry stage 26 can generate and transmit an overwrite message for each received vertex, thus freeing buffer space for storing more vertex data. In some embodiments, an overwrite message may be generated for each vertex. In other embodiments, however, the geometry stage 26 forwards an overwrite message after it determines that a full set of vertices has been processed.

After receipt of the attribute data, the graphics processor 18 begins to process the primitive in its conventional pipelined manner (step 312). For example, the graphics processor 18 may perform lighting, fog, clipping, and texture operations to the primitive. In addition, the rasterization stage 28 illustratively rasterizes the primitive and, when processing is completed, forwards data representing the fully processed primitive to the frame buffer 30. If double buffered, the frame buffer 30 could store the data of a fully processed image in its display portion of memory while receiving the pixel data (for the image currently being formed) in its write portion of memory.

It should be noted that although the graphics processor 18 is disclosed as performing many of the steps of FIG. 3, one or more other components may perform those steps. For example, a separate set of processing modules may assemble and determine if a primitive will be visible on a to-be-displayed image. Accordingly, discussion of the computer system 10 and noted graphics subsystem components as performing the process is exemplary and not intended to limit the scope of the invention.

Some embodiments of the invention thus make a decision before permitting the graphics processor 18 to receive attribute data; namely, whether a primitive will not be viewable on the display device 20 when rendered. Until and unless this decision is made, no attribute data will be received by, and thus processed through, the graphics processor input. Accordingly, as noted above, many potential bottlenecks at the input can be avoided because it receives less unnecessary data. The graphics processor input therefore should receive relevant data in a much more rapid and efficient manner than those within systems that do not implement the disclosed processes.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and method may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other things, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of processing a primitive for potential display as a part of a graphical image on a display device, the primitive having associated attribute data and positional data, the method comprising:
   assembling the primitive as a function of the positional data;
   determining if the primitive is incapable of being viewable in the graphical image on the display device; and
   causing at least a portion of the attribute data to be received by a graphics processor as a function of whether the primitive is incapable of being viewable in the graphical image on the display device.

2. The method as defined by claim 1 wherein causing comprises causing at least a portion of the attribute data to be received by the graphics processor if the primitive is not determined to be incapable of being viewable in the graphical image on the display device.

3. The method as defined by claim 1 wherein the attribute data is not received by the graphics processor if the primitive is determined to be incapable of being viewable in the graphical image on the display device.

4. The method as defined by claim 1 wherein determining includes performing culling operations to the assembled primitive.

5. The method as defined by claim 1 further comprising storing the attribute data in memory that is external to the graphics processor, causing including causing the attribute data to be forwarded from the memory to the graphics processor as a function of whether the primitive is incapable of being viewable in the graphical image on the display device.

6. The method as defined by claim 1 wherein assembling includes forwarding a pointer to the graphics processor, the pointer pointing to memory capable of storing the positional data.

7. The method as defined by claim 1 wherein the graphics processor rasterizes the assembled primitive if it receives the attribute data.

8. An apparatus for processing a primitive for potential display as a part of a graphical image on a display device, the primitive having associated attribute data and positional data, the apparatus cooperating with a graphics processor input, the apparatus comprising:
   an assembler capable of assembling the primitive as a function of the positional data;
   a primitive pre-processor operatively coupled with the assembler, the primitive pre-processor capable of determining if the primitive is incapable of being viewable in the graphical image on the display device; and
   a receiving module operatively coupled with the primitive pre-processor, the receiving module capable of causing the attribute data to be received by the graphics processor input as a function of whether the primitive is incapable of being viewable in the graphical image on the display device.

9. The apparatus as defined by claim 8 wherein receiving module is capable of causing at least a portion of the attribute data to be received by the graphics processor input if the primitive is not determined to be incapable of being viewable in the graphical image on the display device.

10. The apparatus as defined by claim 8 wherein the receiving module does not cause the attribute data to be received by the graphics processor input if the primitive is determined to be incapable of being viewable in the graphical image on the display device.

11. The apparatus as defined by claim 8 wherein primitive pre-processor includes a culling module.

12. The apparatus as defined by claim 8 further comprising memory for storing the attribute data, the memory being external to the graphics processor, the receiving module being capable of causing the attribute data to be forwarded from the memory to the graphics processor input as a function of whether the primitive is incapable of being viewable in the graphical image on the display device.

13. The apparatus as defined by claim 8 wherein the assembler obtains the positional data by receiving a pointer pointing to memory having the positional data.

14. A computer program product for use on a computer system for processing a primitive for potential display as a part of a graphical image on a display device, the primitive having associated attribute data and positional data, the computer program product comprising a computer usable medium having computer readable program code thereon, the computer readable program code comprising program code for determining if the primitive is incapable of being viewable in the graphical image on the display device; and program code for causing at least a portion of the attribute data to be forwarded to a graphics processor as a function of whether the primitive is incapable of being viewable in the graphical image on the display device.

15. The computer program product as defined by claim 14 wherein the program code for determining includes program code for assembling the primitive as a function of the positional data.

16. The computer program product as defined by claim 14 wherein the program code for causing comprises program code for causing at least a portion of the attribute data to be received by the graphics processor if the primitive is not determined to be incapable of being viewable in the graphical image on the display device.

17. The computer program product as defined by claim 14 wherein the attribute data is not received by the graphics processor if the primitive is determined to be incapable of being viewable in the graphical image on the display device.

18. The computer program product as defined by claim 14 wherein the program code for determining includes program code for culling the assembled primitive.

19. The computer program product as defined by claim 14 further comprising program code for storing the attribute data in memory that is external to the graphics processor, the program code for causing including program code for forwarding the attribute data from the memory to the graphics processor as a function of whether the primitive is incapable of being viewable in the graphical image on the display device.

20. The computer program product as defined by claim 14 wherein the program code for assembling includes program code for forwarding a pointer to the graphics processor, the pointer pointing to memory capable of storing the positional data.

* * * * *